United States Patent
Cox et al.

(10) Patent No.: US 7,014,769 B1
(45) Date of Patent: Mar. 21, 2006

(54) METHOD FOR REDUCING NITRATE CONCENTRATION IN WASTEWATER

(75) Inventors: Raleigh L. Cox, Baton Rouge, LA (US); Christopher E. Cox, Denham Springs, LA (US); Brenda Guy, Baton Rouge, LA (US); Michael D. Catanzaro, Baton Rouge, LA (US); Murphy M. Arcemont, III, Gonzales, LA (US); Travis L. LeJeune, Baton Rouge, LA (US)

(73) Assignee: Pentair Pump Group, Inc., Golden Valley, MN (US)

(*) Notice: Subject to any disclaimer, the term of this patent is extended or adjusted under 35 U.S.C. 154(b) by 0 days.

(21) Appl. No.: 10/863,017

(22) Filed: Jun. 8, 2004

Related U.S. Application Data

(63) Continuation-in-part of application No. 10/447,464, filed on May 29, 2003, and a continuation-in-part of application No. 09/964,213, filed on Sep. 26, 2001, now abandoned, which is a continuation-in-part of application No. 09/481,462, filed on Jan. 11, 2000, now Pat. No. 6,332,978.

(51) Int. Cl.
*C02F 3/30* (2006.01)

(52) U.S. Cl. ............... 210/614; 210/629; 210/630; 210/903

(58) Field of Classification Search ........... 210/605, 210/614, 626, 628, 630, 195.3, 221.2, 96.1, 210/139, 143, 220, 629, 903
See application file for complete search history.

(56) References Cited

U.S. PATENT DOCUMENTS

| | | | |
|---|---|---|---|
| 4,663,044 A | 5/1987 | Goronszy | |
| 5,030,353 A | 7/1991 | Stuth | |
| 5,156,742 A | 10/1992 | Struewing | |
| 5,200,081 A | 4/1993 | Stuth | |
| 5,308,479 A | 5/1994 | Iwai et al. | |
| 5,490,935 A | 2/1996 | Guy | |
| 5,545,327 A | 8/1996 | Volland | |
| 5,582,734 A | 12/1996 | Coleman et al. | |
| 5,714,061 A | 2/1998 | Guy et al. | |
| 6,153,099 A | 11/2000 | Weis et al. | |
| 6,332,978 B1 * | 12/2001 | Catanzaro et al. | 210/96.1 |

* cited by examiner

*Primary Examiner*—Peter A. Hruskoci
(74) *Attorney, Agent, or Firm*—Jones, Walker, Waechter, Poitevent, Carriere & Denegre, L.L.P.

(57) ABSTRACT

The present invention is a method for reducing the nitrate concentration in wastewater within a wastewater treatment apparatus configured to define an aeration zone and a quiescent zone or dilution zone. The method comprises the step of ceasing airflow into the aeration zone for a predetermined time period or until the dissolved oxygen level within the wastewater has reached a predetermined threshold. The method also comprise the step of mixing the wastewater in the aeration zone to prevent suspended particles within the wastewater in the aeration zone from settling and to avoid substantially disturbing the quiescence of the quiescent zone.

13 Claims, 5 Drawing Sheets

METHOD FOR REDUCING NITRATE CONCENTRATION IN WASTEWATER

This application is a continuation-in-part of U.S. application Ser. No. 09/964,213 filed on Sep. 26, 2001, now abandoned, which application was a continuation-in-part of U.S. application Ser. No. 09/481,462 filed on Jan. 11, 2000, now U.S. Pat. No. 6,332,978, and this application hereby claims the priority benefit of each preceding application. This application is also a continuation-in-part of U.S. application Ser. No. 10/447,464 filed on May 29, 2003 now U.S. Pat. No. 6,942,788, which application is incorporated herein by reference in its entirety, and this application claims the priority benefit of the Ser. No. 10/447,464 application.

BACKGROUND OF THE INVENTION

1. Field of the Invention

This invention relates to the treatment of wastewater, namely a method for reducing nitrate concentration in wastewater.

2. Background

Wastewater is treated to remove its bacterial nutrients, principally biochemical oxygen demand (BOD). BOD is degraded by bacteria primarily by consuming dissolved oxygen (DO) to assist in metabolizing the BOD (aerobic metabolism). Oxygen is provided in treatment systems by aeration. In an oxygen depleted environment when DO levels in the wastewater are sufficiently reduced (anoxic environment), bacteria readily metabolizes nitrates in the wastewater. Nitrate reduction by bacteria, however, is generally inefficient in the presence of oxygen. Bacteria capable of functioning in oxygen-rich and oxygen-poor environments will preferably metabolize nutrients aerobically.

If an anoxic environment is maintained for a sufficient time period, nitrate levels within the wastewater can be substantially reduced because bacteria will be forced to consume nitrates (hereinafter referred to as nitrate metabolism) as a food source resulting in reduced nitrate concentrations in the effluent (outgoing water). This process is referred to as de-nitrification. Note that minor de-nitrification may occur in an aerobic system if pockets of the treatment system are isolated due to poor current flow (hence poor oxygen flow) within the system. Additionally, in large bacteria or dense bacteria colonies, de-nitrification can occur in an aerobic environment. In large bacteria, oxygen transport in the cell may be inefficient resulting in interior parts of the cell undergoing anaerobic metabolism or nitrate metabolism. In large bacteria colonies, bacteria buried in the colony may not be exposed to the same levels of oxygen as exposed portions of the bacterial mass) and hence portions of these buried masses may undergo nitrate metabolism. A buried bacterial mass is more likely to occur in a fixed film treatment process. These instances of nitrate metabolism are considered insubstantial, and are insufficient to substantially reduce nitrate levels as required by new treatment standards.

New environmental regulations are requiring reduction in nitrate levels in the effluent from wastewater treatment systems. Several methods, such as those disclosed in U.S. Pat. Nos. 5,582,734 and 4,663,044, discuss possible solutions to nitrate removal in large municipal and commercial wastewater treatment plants. These solutions are inapplicable to relatively small, self-contained wastewater treatment systems that are employed throughout the United States for the treatment of wastewater. The small self-contained systems serve wastewater sources that include single family dwellings located in areas not served by municipal sewerage systems. Like larger commercial and municipal treatment systems, these smaller systems are becoming subjected to stricter nitrate removal regulations and encounter treatment problems when attempting to reduce nitrate levels in the wastewater. Unfortunately, no practical solution has been provided that will effectively solve the problems encountered by the small, self-contained systems.

ADVANTAGES AND OBJECTS OF THE INVENTION

The methods of the present invention provide a solution for small, self-contained wastewater treatment systems and work without interruption of flow into the systems. The present invention works with existing and new systems without additional substantial expense and effort and provides methods for effective nitrate reduction in the effluent from the small, self-contained systems.

With the aforementioned considerations in mind, it is therefore an object of this invention to provide a method for reducing nitrate levels in wastewater.

It is a further object of this invention to provide a safe and economical method of reducing nitrate concentration in wastewater that can be used with existing wastewater treatment systems.

It is a further object of the present invention to provide a method for reducing nitrate concentration in wastewater that can be implemented during a continuous wastewater flow situation.

It is a further object of the present invention to provide a method of reducing nitrate concentration in wastewater wherein the method is activated during periods of heavy diurnal flow.

It is a further object of the present invention to provide a method of reducing nitrate concentration in wastewater wherein the method is activated by a change in the dissolved oxygen level in the wastewater.

These and other advantages and objects of this invention shall become apparent from the ensuing description of the invention.

SUMMARY OF THE INVENTION

The present invention comprises apparatuses and methods for reducing the nitrate concentrations in wastewater.

The present invention comprises a method for reducing nitrate concentration in wastewater in a wastewater treatment apparatus configured to define an aeration zone or mixing zone, and a quiescent zone or a dilution zone, wherein wastewater may continuously flow into the aeration zone. The wastewater treatment apparatus further comprises at least one gas or air outlet positioned within the aeration zone to provide gas flow into the aeration zone when wastewater is present in the aeration zone. The method comprises the step of ceasing gas flow into the aeration zone for a predetermined nitrate reduction period.

The present invention is also a method comprising the steps of ceasing gas flow into the aeration zone during periods of heavy flow and intermittently mixing the wastewater within the aeration zone.

The present invention also comprises a method for reducing the nitrate concentration in wastewater wherein the wastewater apparatus further comprises a dissolved oxygen monitor positioned to monitor the dissolved oxygen levels of the wastewater in the aeration zone. The method comprises the steps of: (a) monitoring the dissolved oxygen level in the aeration zone; (b) ceasing gas flow into the aeration zone when a predetermined dissolved oxygen level has been reached; and (c) resuming gas flow into the aeration zone when a second predetermined threshold has been reached or a certain period of time has elapsed.

The present invention also comprises a method for reducing nitrate concentration in wastewater in a wastewater treatment apparatus wherein the method comprises the steps of: (a) monitoring the dissolved oxygen level in the aeration zone; (b) ceasing gas flow into the aeration zone when a predetermined dissolved oxygen level has been reached; and (c) mixing the wastewater in the aeration zone.

The present invention also comprises a wastewater treatment apparatus configured to have an aeration zone and a quiescent zone or a dilution zone. The apparatus comprises: (a) at least one gas outlet positioned in the aeration zone and fluidly connected to a source of gas; (b) a dissolved oxygen probe positioned in the aeration zone; and (c) a first controller adapted to regulate gas flow from the source of gas wherein the dissolved oxygen probe provides a dissolved oxygen measurement that is input to the first controller. The present invention also comprises a wastewater treatment apparatus configured to define an aeration zone and a quiescent zone or a dilution zone. The apparatus comprises: (a) one or more gas outlets positioned in the aeration zone; (b) a timer or other timer device adapted to regulate gas flow from a source of gas to the gas outlets based on time or elapsed time; and (c) a repeat cycle timer or other timer device adapted to regulate gas flow from the source of gas to the gas outlets based on time or elapsed time, whereby substantially continuous gas flow into the gas outlets is suspended, and during the period of suspension, gas flow to the gas outlets at predetermined mixing intervals for brief predetermined mixing periods.

DETAILED DESCRIPTION OF PREFERRED EMBODIMENTS OF THE INVENTION

Illustrations of construction, design, and methods of operation of the invention are set forth below with specific references to the Figures. However, the inventors do not intend to limit the scope of the invention to these embodiments.

Figure 2:
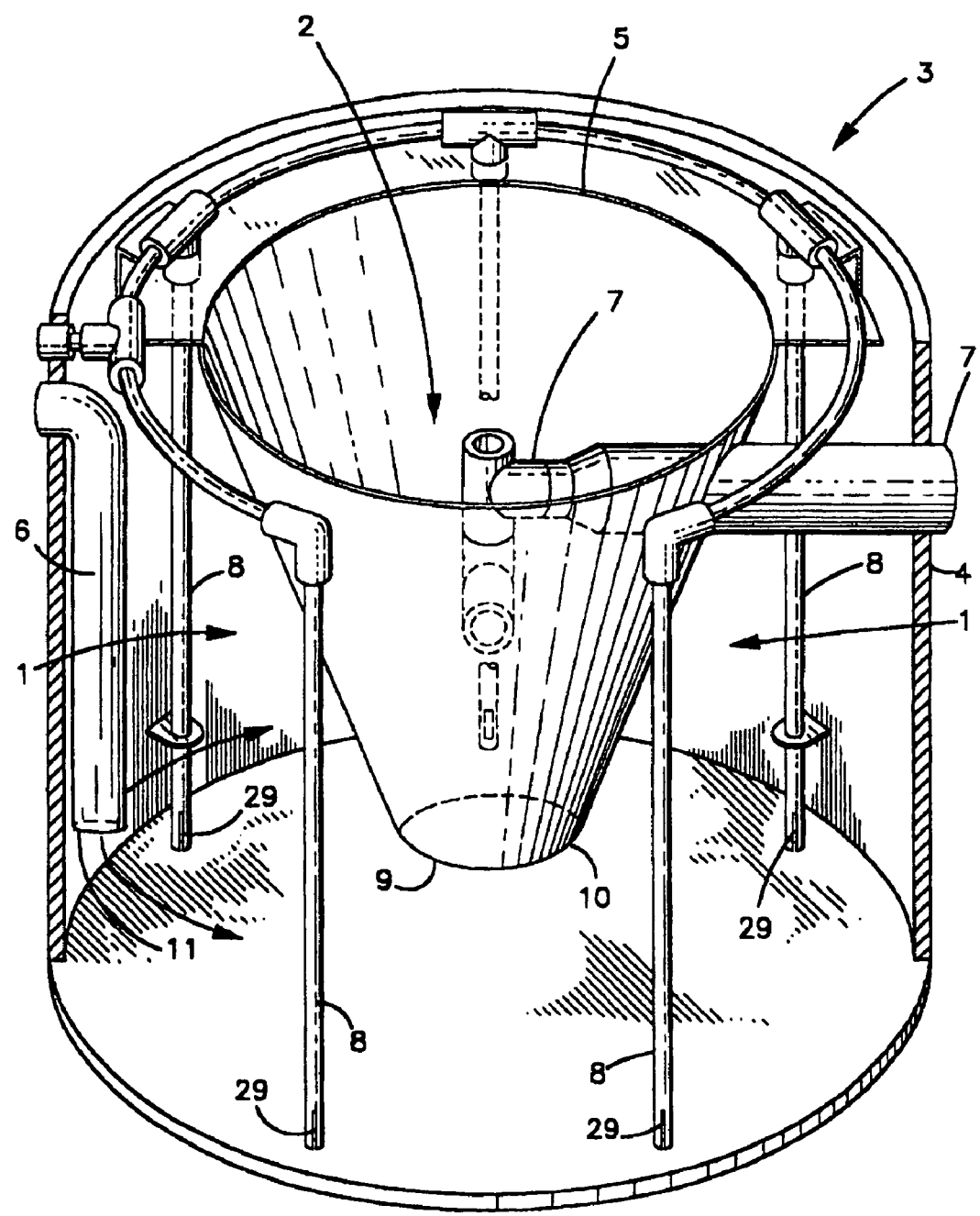
FIG. 2 illustrates a wastewater treatment apparatus that has the wastewater inlet positioned near the bottom of the tank.
Figure 3:
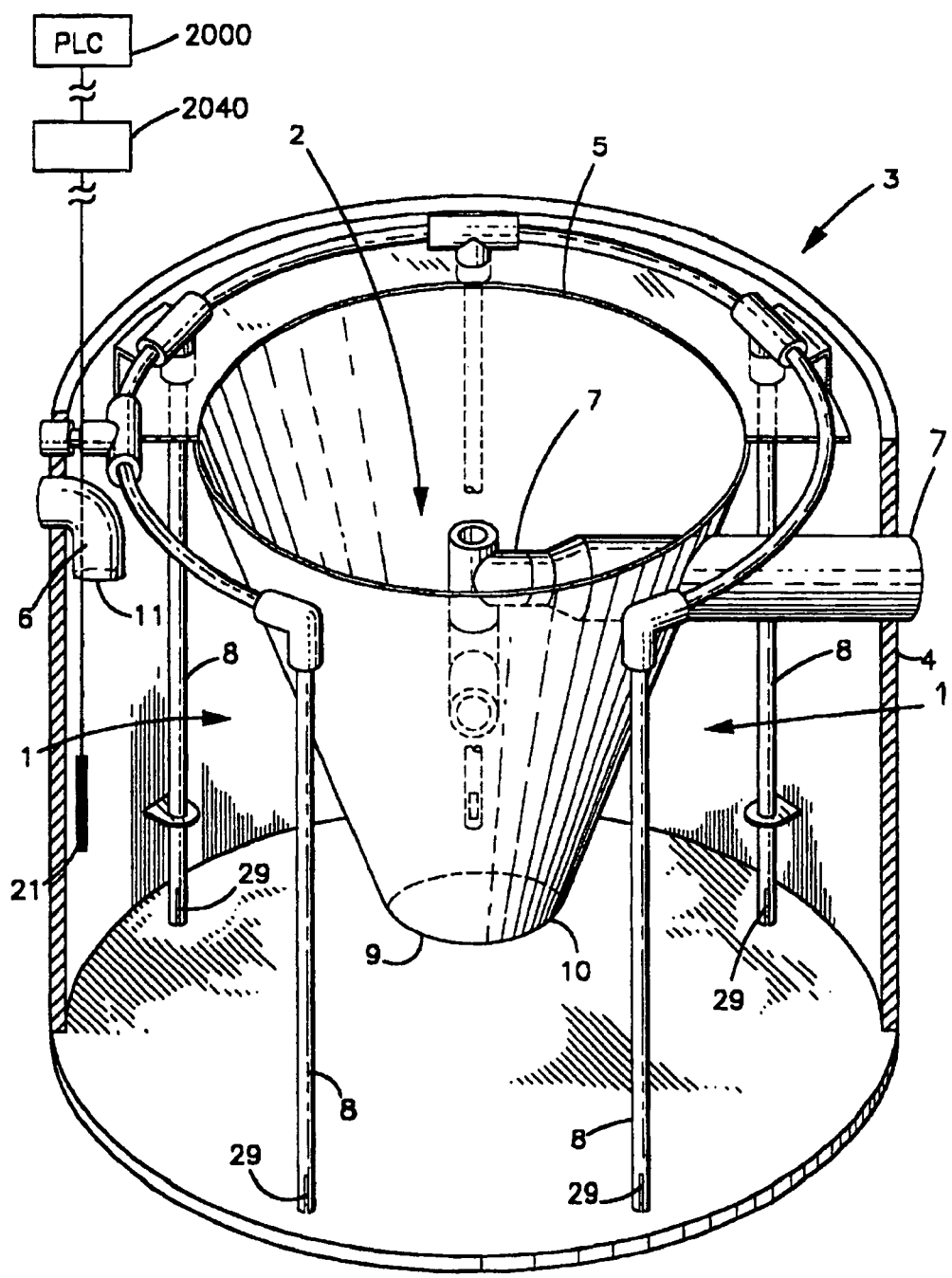
FIG. 3 illustrates a wastewater treatment apparatus that includes a DO probe.

The present invention may be used in a variety of wastewater treatment applications and apparatuses that are configured to define an aeration zone 1 and a quiescent zone 2. An example of such an apparatus 3 is shown in FIGS. 1–3. The construction and conventional operation of a suitable apparatus 3 is discussed in detail in U.S. Pat. Nos. 5,490,935 and 5,714,061 that are incorporated by reference.

Figure 1A:
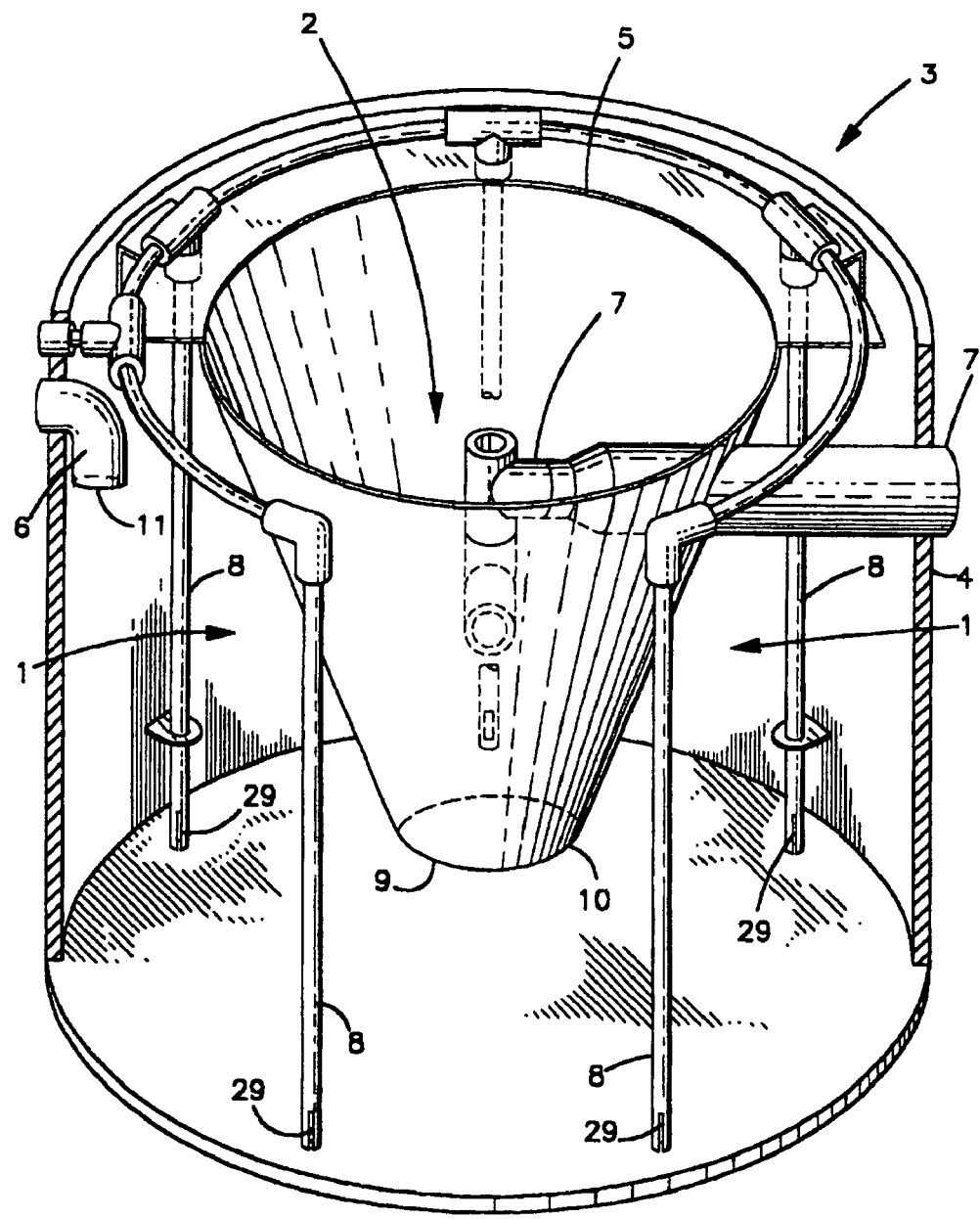
FIG. 1A illustrates a wastewater treatment apparatus that may be used with the methods of the present invention.

Viewing FIG. 1A, apparatus 3 comprises a tank 4 with a hopper 5 positioned therein. The volume within hopper 5 defines quiescent zone 2, and the volume between hopper 5 and tank 4 defines aeration zone 1. An opening 9 within the lower end 10 of hopper 5 allows fluid communication between zones 1 and 2. Apparatus 3 also comprises a wastewater inlet 6 and a wastewater outlet 7 positioned within quiescent zone 2 and extending from apparatus 3. One or more air drops 8 having gas outlets 29 are positioned within aeration zone 1 to deliver a gas, preferably air, from a source of gas (not shown), such as an air compressor, into aeration zone 1.

Wastewater enters apparatus 3 through inlet 6 where it is aerated in aeration zone 1 before eventually flowing into quiescent zone 2 where substantially all suspended particles within the wastewater settle out before the wastewater exits through outlet 7.

Figure 1B:
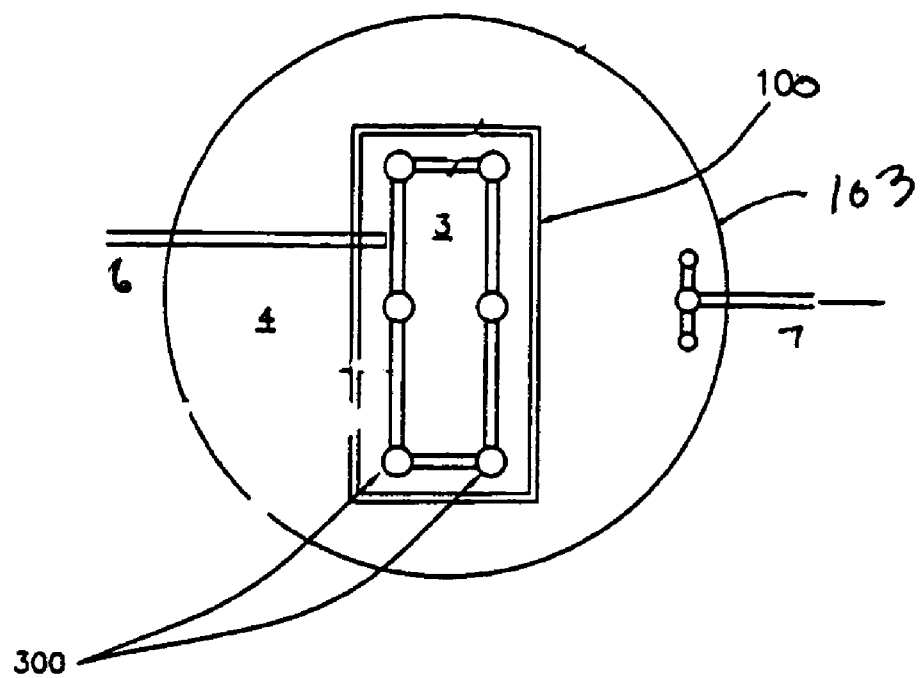
FIG. 1B illustrates a second type of wastewater treatment apparatus that can be used with the methods of the present invention, utilizing a fixed film reactor.
Figure 1B:
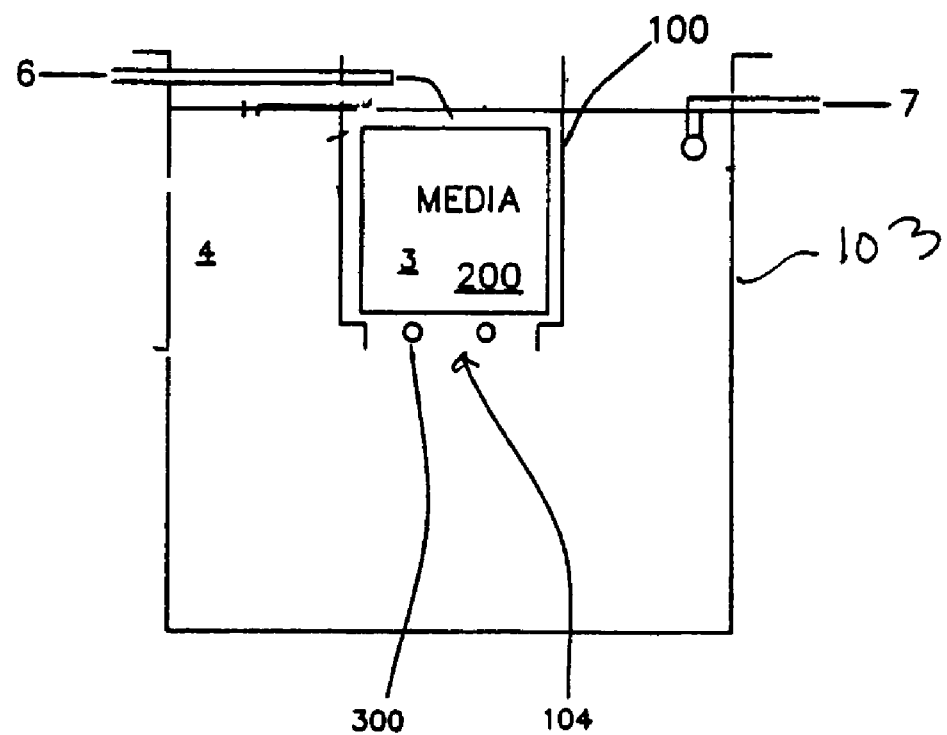

The type of treatment apparatus shown in FIG. 1A is considered a suspended growth treatment apparatus, as the treating microbes are suspended or free floating throughout the treatment system. A second type of treatment apparatus is shown in FIG. 1B, a fixed film treatment system. Shown is a tank 103, with a media container 100 positioned within the tank 103 and air inlets or injectors 300 positioned below the media container 100. In the fixed film system, growth media 200 is placed in the media container 100. The growth media presents a surface area for attachment and growth of a bacterial mass (the fixed film of bacteria) to the media. While there will be some bacteria freely floating through this system, the density of the microbial or treating biological mass is much higher within the reaction chamber, the primary treating area. This system is still an aerobic treatment system, having an aeration zone where oxygen is input into the system. In the fixed film reactor, the aeration zone is the mixing zone (primarily the interior of the mixed media container, volume 3, and the volume 104 immediately adjacent the air injectors 300). For purposes of this application, the mixing zone is considered an aeration zone. The remainder of the tank volume 4 acts as a dilution zone or quiescent zone. The dilution zone 4 is immediately adjacent and in direct fluid communication with the aeration or mixing zone. The system includes an inlet 6 and an outlet 7. The inlet is shown as emptying into the media container (preferably, into the top portion of the media container). While this is preferred, the inlet may also empty into the volume adjacent to the media container. The outlet 7 draws from the dilution zone of the system. A further description of this system can be found in application Ser. No. 10/447,464 filed on May 29, 2003 (hereby incorporated by reference in its entirety). Other designs for fixed film treatment systems are shown and described in U.S. Pat. Nos. 6,153,099; 5,156,742; 5,030,353; 5,200,081; 5,545,327; and 5,308,479, all hereby incorporated by reference.

Many wastewater systems experience periods of heavy influent flow where the flow rate of the entering wastewater is increased. These periods of heavy flow (also referred to as diurnal flow) usually occur in the morning and in the evening when most people are at their homes and using more water than at other periods during the day. The following description will use the suspend growth treatment system of the type shown in FIG. 1A as the exemplary system, but the method is also applicable to a fixed film type of treatment system and differences will be noted.

During diurnal flow (a period of heavy flows, usually present at two periods during the day, which, for residences, is in the morning (preparing for work) and in the evening (preparing for bed)), the DO levels in the aeration zone 1 are reduced because bacteria within the wastewater consumes oxygen in metabolizing the high BOD levels present in the influent wastewater. Because DO levels in the system decrease during periods of heavy flow (and consequently high BOD), these heavy flow periods are ideal for nitrate removal because the amount of oxygen available for BOD metabolism is decreased. Consequently, bacteria will gravitate toward nitrate metabolism. While the use of the present invention during the peaks of diurnal flow is preferred, the methods may also be used outside of the periods of diurnal flow.

In a fixed film type of system, DO levels will also vary based upon BOD levels in the system; however, changes in BOD within the mixing chamber may not be reflected in a measurable change in DO within the mixing chamber. In the fixed film reactor, the mixing chamber is generally a compact volume which is directly aerated underneath the chamber. Hence, DO levels in the mixing chamber will usually remain high due to the close proximity to the air injectors, regardless of the BOD levels. Hence, a DO measurement within the mixing chamber may not accurately reflect changes in BOD levels occurring within the mixing chamber. However, measurement of DO elsewhere may be more representative of BOD levels, for instance, measurement of DO levels below the air injectors may be more suitable. Alternatively, instead of using a DO probe, a flow meter or other flow detection devices known in the art may be used to detect flows.

A flow meter is a device placed in the inlet (or outlet) to detect flows through the system. A flow meter may be a mechanical type flow meter or electrical type flow meter that is known in the industry. A flow meter may be a simple switch to detect a flow, as opposed to flow rates. The flow detector data (or the DO level data, or both) may be used alone or used in conjunction with time information to initiate decisions on nitrate reduction, as later described.

One method for reducing the nitrate concentration of wastewater in a wastewater treatment apparatus 3 is ceasing the gas (preferably air) flow into apparatus 3 for a nitrate reduction period during flow intervals (more preferred, heavy flows) or when the DO level in the wastewater in aeration zone 1 reaches a first predetermined threshold, usually at or below about 2.0 mg/l such as in the range of 2.0 mg/l to 0.5 mg/l. It is believed that a threshold level below 1.0 mg/l is preferred. The method is more efficient if aeration ceases during periods of heavy flows, but can be undertaken at other times regardless of the flows. Reduction of nitrates to a designated level during periods of low or no flows will take longer due to the presence of higher DO levels at the initiation of the nitrate reduction period. The nitrate reduction period can vary by apparatus, but the predetermined nitrate reduction periods preferably lasts between about 1 and about 2 hours (for a 500 gallon tank 4) or other time sufficient to substantially reduce the nitrate concentration of the wastewater. The end of the nitrate reduction period can be initiated based upon elapsed time, a predetermined DO "start-up" threshold, or by detecting changes over time in the Oxidation Reduction Potential (ORP) in the treatment process. Because DO probes can be unreliable at low DO levels or may not be directly indicative of the state or progress of nitrate removal, another type of probe can be used to measure ORP, which measurement can be directly related to the progress of nitrate removal. A suitable differential change in the ORP measurements is determinative of when de-nitrification is complete or near complete. A more complete explanation of the ORP probes, measurements and methods of using is contained in U.S. Pat. No. 5,582,734 issued to Coleman and Stensel which is hereby incorporated by reference in its entirety. As noted, the predetermined nitrate reduction period is predetermined by time, desired DO levels or desired ORP changes.

The method for reducing nitrate concentration of wastewater may also include a mixing step to ensure that some of the particles that settle during the nitrate reduction period are re-suspended in aeration zone 1. Preferably, the wastewater in the aeration zone 1 is mixed so that particles in the wastewater do not settle and are efficiently metabolized during the de-nitrification process. The efficiency of the present methods is increased when the bacteria are circulated throughout aeration zone 1 to allow de-nitrification to occur throughout aeration zone 1 (as opposed to being concentrated at the bottom of tank 4). With a fixed film reactor, mixing is still necessary to assist the transport of food to the biomass during the nitrate reduction period. However, if the bursts from the air injectors are used and input underneath the media, the burst should be kept of short duration (such as less than one minute) to prevent the DO levels in the reaction chamber from rising to a point where normal aerobic metabolism is initiated. Hence, shorter mixing bursts are desired, but to maintain adequate mixing or stirring of the reactor, the frequency of the bursts may be increased.

The mixing step can be performed in a variety of ways. In one embodiment, gas is intermittently flowed through gas outlets 29, such as by: (1) pulsing gas through at least one gas outlet 29 at predetermined mixing intervals and/or for predetermined mixing periods; (2) flowing a sufficient amount of gas through at least one gas outlet 29 at a sufficient flow rate to re-suspend most of the settled particles within the wastewater; and/or (3) continuously flowing gas through at least one gas outlet 29 at a predetermined mixing interval for a predetermined mixing period.

Figure 4A:
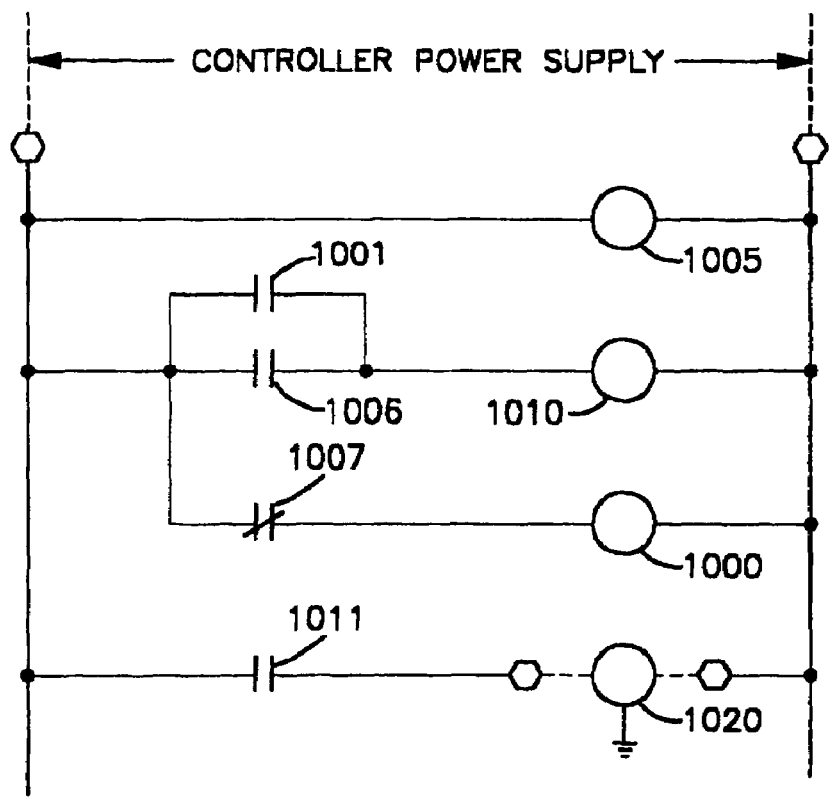
FIG. 4A illustrates a schematic of an embodiment of the timer/repeat cycle timer control system.

Viewing FIG. 4A, the pulsing or intermittent flow through gas outlets 29 can be accomplished using: (1) a clock timer 1005 or other timer type means to control the start of the de-nitrification sequence (e.g., shutting off the gas [air] source or reducing the air supply); and (2) a repeat cycle timer 1000 or other timer type device to periodically pulse the air source for flow. Other "timing" devices or means could be substituted for the clock timer and repeat cycle timer. For instance, a timer could be used for the repeat cycle timer, and an internal clock of a processor, clock circuit, or PLC circuit could be used as a substitute for the clock timer or repeat cycle timer; alternatively, the timer means could be a software embodied "virtual clock"; all such timing devices are considered as a timing means. The control system shown in FIG. 4A comprises a repeat cycle timer 1000 and associated contacts 1001, a clock timer 1005 and associated contacts 1006 and 1007, a controller 1010 and associated contacts 1011, and a source of gas (air), preferably a compressor 1020. Similar devices can be employed in a fixed film reactor.

When controller contacts 1011 are closed, power is provided to compressor 1020, and compressor 1020 flows air through gas outlets 29. Power is provided to controller 1010 when clock contact 1006 is closed (and consequently clock contact 1007 is open). When clock contact 1006 is open, clock contact 1007 is closed, thereby providing power to repeat cycle timer 1000 to periodically (at the predetermined mixing intervals) close contact 1001 for specific periods of time (predetermined mixing periods). In turn, power is provided to controller 1010 and compressor 1020, thereby regulating flow through air drops 8 and gas outlets 29. Accordingly, both timer 1005 and repeat cycle timer 1010 are adapted to regulate the air flow from compressor 1020 to gas outlets 29 by controlling the power input to compressor 1020.

When apparatus 3 is configured to flow gas into aeration zone 1 at predetermined mixing intervals, the predetermined mixing intervals are sufficiently spaced so that suspended particles within the wastewater in aeration zone 1 do not settle, preferably between about 10 and about 20 minutes. At the beginning or end of each predetermined mixing interval, gas flows through at least one gas outlet 29 for a predetermined mixing period, preferably long enough to sufficiently mix the wastewater in aeration zone 1, but not long enough to substantially raise DO levels. If DO levels are raised sufficiently, the biological mass or a substantial portion of the biological mass will migrate from nitrate metabolism to aerobic metabolism, an undesired result. In the presence of air bursts, it is anticipated that some bacteria may use additional oxygen for aerobic metabolism, but will rapidly revert to nitrate metabolism after the added oxygen is exhausted (when DO falls to desired levels). Hence, the burst should be short enough to allow quick exhaustion of the added oxygen. Clearly, the DO levels cannot be so great that oxygen exhaustion occurs shortly before the onset of the next mixing period, as nitrate reduction will not occur. Air for mixing can be supplied through one of the air outlets 29, or through a separate line. For a 500-gallon tank 4, a preferred predetermined mixing period is about 1 minute.

In alternative embodiments, mixing can be provided by propellers within aeration zone 1, pumps, or other means to stir the wastewater in aeration zone 1. A simple means of stirring or mixing the wastewater step may be accomplished by suitably positioning wastewater inlet 6 so that the incoming flow of wastewater creates a current (shown by the arrows in FIG. 2) to accomplish the desired mixing.

A suitable embodiment is shown in FIG. 2, where the inlet end 11 of wastewater inlet 6 is positioned near the bottom of tank 4. Inlet end 11 is positioned so that wastewater flowing from inlet end 11 does not pass into quiescent zone 2 through opening 9 until after it has been treated in aeration zone 1. When positioned near the bottom of tank 4, inlet end 11 should not be positioned so that incoming wastewater is directed toward opening 9. Placing inlet end 11 so that incoming wastewater flows tangentially to the walls of tank 4 prevents these problems. Alternatively, the mixing may be accomplished by combining some of the above means, such as placing inlet end 11 near the tank bottom and pulsing air into aeration zone 1 during the de-nitrification process.

Viewing FIG. 3, apparatus 3 may further comprise a probe 21 that monitors and measures DO levels in aeration zone 1 and is in communication with a source of air (compressor 1020) using a valve, relay, solenoid or other suitable device to regulate or cease air flow through outlets 29. A suitable DO probe 21 is model TEII Flouroprobe and Meter available from Tipton Environmental Inc. of Milford, Ohio. The air flow through air drops 8 ceases when probe 21 has detected a predetermined DO level or a predetermined change in DO level.

The predetermined change in DO levels may be a 10–20 percent change between measurements. Alternatively, the predetermined change in DO levels may be a 15 percent change over a running average of the measured DO levels for a twenty-minute period (the background level) when compared with the running average over a shorter period (e.g., 5 minutes).

Figure 4B:
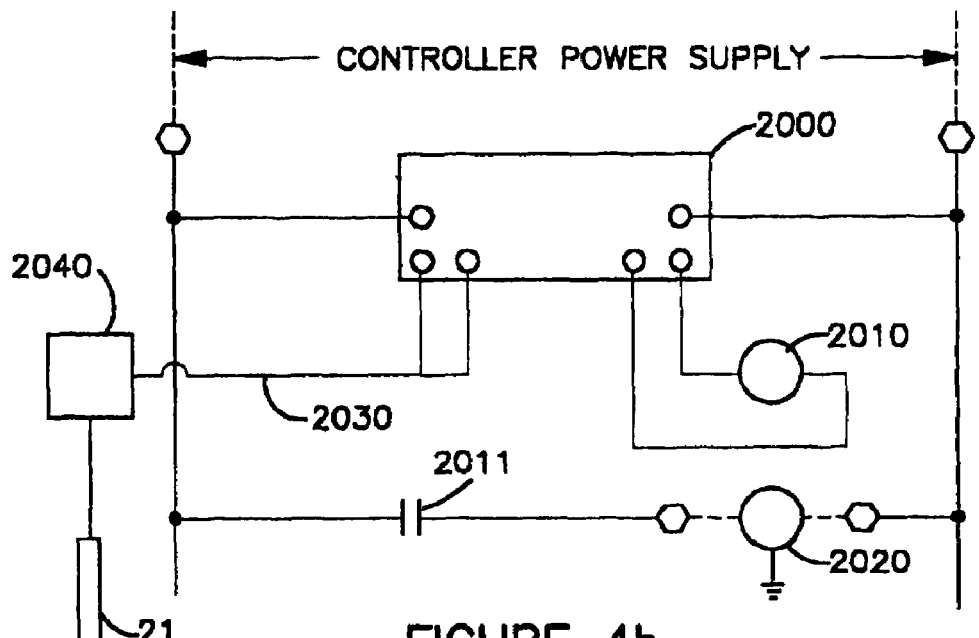
FIG. 4B illustrates a schematic of an embodiment of the programmed logic controller-DO input control system.

Referring to FIG. 4B, control of the process may be provided by a first controller 2001, such as programmable logic controller (PLC) 2000, and any included or associated memory storage devices. DO probe 21, through DO meter 2040, outputs a signal 2030 to PLC 2000. PLC 2000 then operates compressor controller 2010 to close contact 2011 to operate a compressor 2020 to regulate the air flow from compressor 2020 by controlling the power supply to compressor 2020. PLC 2000 may have associated memory to record DO measurements or flow data measurements or ORP measurements for using the measurements in calculations (e.g., determining background DO or flow levels or the presence of flows or ORP levels). PLC 2000 should also have an internal clock or associated with an external clock (not shown) so that PLC 2000 can pulse compressor controller 2010 as needed (and if desired) during de-nitrification, or simply power-up compressor controller 2010 after a predetermined time interval, such as the predetermined mixing interval.

Air flow through air drops 8 may resume when a second predetermined threshold is reached. Second predetermined threshold may comprise a time period (elapsed time), a subsequent DO level (or a subsequent DO level and an elapsed time after reaching the subsequent DO level), or predetermined percent change between subsequent DO levels or a plurality of sequential DO levels or detection of the desired change in ORP levels. In terms of time, a second predetermined threshold may equal the predetermined nitrate reduction period, approximately 1–2 hours. The second predetermined threshold may also equal a subsequent DO measurement, about 1.0 mg/l or less, a subsequent predetermined percent change between subsequent DO measurements, or a subsequent predetermined percent change over a plurality of DO measurements. The second predetermined threshold is preferably not a subsequent DO level alone, as DO meters tend to be erratic and/or unreliable at low DO readings.

Alternatively, initiation of the nitrate reduction period may be on a flow detection basis (using a flow meter) with or without utilization of elapsed time. For instance, the nitrate reduction period may be initiated if flow is detected, or detected for a predetermined period (for instance, a flow period of 15 minutes consecutively, or flows detected for a 20 minutes (cumulatively) within a 30 minute interval). Alternatively, the nitrate reduction initiation might be based upon time of day and flow rates: for instance, the system could be programmed to initiate nitrate reduction upon the first flow detection between the hours of 5 pm to 10 pm.

In a fixed film reactor, if a DO probe is utilized to restart aeration to terminate the nitrate reduction period, then locating the probe within the reactor vessel or the mixing zone is preferred. If however, a DO probe is utilized to initiate the start of the nitrate reduction period, location within the reactor vessel may not be preferred due to the probes proximity to the air injectors. In this instance, the DO probe may be better located in the dilution zone or in the volume below the air injectors. If a DO probe will be used to initiate and cease the nitrate reduction period, it may be preferable to utilize two DO probes, one in the mixing zone (to monitor DO levels in order to restart aeration) and one in the dilution zone (to monitor DO levels in order to terminate aeration). If a single DO probe is to be used for both functions, the preferred location is below the air injectors, less preferred in the dilution zone. If the particular application requires a DO probe in the reactor itself, it is preferred that the DO probe be located in the reactor where it is less likely to come into contact with upwelling air or oxygen bubbles injected by the aerators.

The present methods may take a variety of combinations of the different steps described herein. For example, the present method may comprise ceasing gas flow for a predetermined nitrate reduction period. The present method may comprise ceasing airflow into apparatus 3 and mixing the wastewater in aeration zone 1. The present method may comprise monitoring the DO levels, or flow data, or time data, and ceasing gas flow based upon the monitored quantity (or a combination of the monitored quantities), and resuming gas flow when a second predetermined threshold has been reached, with no mixing involved, such as a dissolved oxygen level of about 1.5 mg/l. Finally, the method may comprise monitoring the DO levels, ceasing air flow into the aeration zone when the DO level has reached a first predetermined threshold, and mixing wastewater in aeration zone 1.

Unlike prior art methods, the present method may be used as wastewater continuously flows into apparatus 3 eliminating the necessity of ceasing flow into the wastewater treatment system during the nitrate reduction period. The embodiments described herein are designed so that apparatus 3 may accept incoming wastewater without requiring sequential batch processing or storage of influent during de-nitrification.

Although the preferred embodiment has been described, it will be appreciated by those skilled in the art that the present invention pertains to modifications, changes, and improvements that may be made without departing from the spirit of the invention defined by the claims.

We claim:

1. A method for reducing nitrate concentration in wastewater in a wastewater treatment apparatus configured to define an aeration zone and a quiescent zone, wherein wastewater flows into said treatment apparatus, wherein said wastewater treatment apparatus further comprises at least one gas outlet positioned within said aeration zone to aerate said wastewater, said wastewater having a dissolved oxygen level, said method comprising the step of substantially ceasing gas flow into said aeration zone for a nitrate reduction period, where said length of said nitrate reduction period is sufficient to initiate nitrate metabolism and reduce nitrate concentrations within said aeration zone, and during said nitrate reduction period, mixing said wastewater in said aeration zone by flowing gas through said at least one gas outlet for an mixing period, said mixing period being of a duration to continue nitrate metabolism in said aeration zone during said mixing period without substantially raising said dissolved oxygen level.

2. The method according to claim 1 wherein said step of flowing gas through said at least one gas outlet for a mixing period is undertaken at a sufficient flow rate to mix said wastewater.

3. The method according to claim 1 wherein said step of flowing gas through said at least one gas outlet for a mixing period is repeated at predetermined mixing intervals during said nitrate reduction period.

4. The method according to claim 3 where said mixing intervals comprise a period between about 10 minutes and about 20 minutes.

5. The method according to claim 3 wherein said mixing period comprises about 1 minute.

6. The method according to claim 1 wherein said nitrate reduction period is between about 1 and about 2 hours.

7. The method according to claim 1 further comprising the step of measuring the dissolved oxygen level of the wastewater within said wastewater treatment apparatus, wherein said gas flow into said aeration zone is ceased when said measured dissolved oxygen level is in the range of 2.0 mg/l to 0.5 mg/l.

8. The method according to claim 1 wherein said step of said step of flowing gas through said at least one gas outlet for a mixing period is performed by pulsing gas through said at least one gas outlet.

9. A method for reducing the nitrate concentration of wastewater in a wastewater treatment apparatus configured to define an aeration zone and a quiescent zone, wherein said wastewater treatment apparatus further comprises at least one gas outlet positioned within said aeration zone, said gas outlet providing gas flow into said aeration zone when wastewater is present in said aeration zone to aerate said wastewater, said wastewater having a dissolved oxygen level, said method comprising the steps of (a) substantially ceasing gas flow into said aeration zone for a nitrate reduction period during periods of heavy flow where said length of said nitrate reduction period is sufficient to initiate nitrate metabolism and reduce nitrate concentrations within said aeration zone; and (b) mixing said wastewater within said aeration zone during said nitrate reduction period zone by flowing gas through said at least one gas outlet for an mixing period, said mixing period being of a duration to continue nitrate metabolism in said aeration zone during said mixing period without substantially raising said dissolved oxygen level.

10. A method for reducing nitrate concentration in wastewater in a wastewater treatment apparatus configured to define an aeration zone and a quiescent zone, said apparatus further comprising a dissolved oxygen monitor positioned to monitor the dissolved oxygen levels of said wastewater in said aeration zone, said wastewater treatment apparatus comprising at least one gas outlet providing gas to said aeration zone to aerate said wastewater, said wastewater having a dissolved oxygen level, said method comprising the steps of:

(a) monitoring the dissolved oxygen level in said aeration zone; ceasing gas flow into said aeration zone when said dissolved oxygen level falls below a predetermined dissolved oxygen level for a period of time whereby to reduce the nitrate concentration in said wastewater without substantially raising said dissolved oxygen level; and (b) resuming gas flow into said aeration zone when a second predetermined threshold has been reached.

11. The method according to claim 10 wherein said predetermined dissolved oxygen level is in the range of 2.0 mg/l to 0.5 mg/l.

12. The method according to claim 11 wherein said second predetermined threshold is between about 1 and about 2 hours of elapsed time.

13. The method according to claim 11 wherein said second predetermined threshold is a dissolved oxygen level of about 1.5 mg/l.

* * * * *